United States Patent [19]

Booth

[11] 4,337,913

[45] Jul. 6, 1982

[54] MEANS FOR RELEASABLY ATTACHING STRANDS

[76] Inventor: William R. Booth, 2500 N. Woodland, Deland, Fla. 32720

[21] Appl. No.: 99,966

[22] Filed: Dec. 4, 1979

Related U.S. Application Data

[63] Continuation of Ser. No. 895,409, Apr. 11, 1978, abandoned.

[51] Int. Cl.³ .............................................. B64D 17/38
[52] U.S. Cl. .............................. 244/151 B; 24/201 R
[58] Field of Search ............... 244/142, 151 R, 151 A, 244/151 B, 152; 24/73 PH, 201 R, 201 TR, 208 R; 59/84, 85, 88, 89; 280/801, 808; 297/485, 486; 54/85

[56] References Cited

U.S. PATENT DOCUMENTS 3,765,627 10/1973 Snyder ............................ 244/151 A
3,934,848 1/1976 Snyder ............................ 244/151 A

FOREIGN PATENT DOCUMENTS 1226884 10/1966 Fed. Rep. of Germany ... 244/151 A
827946 5/1938 France ............................. 244/151 B
1172592 12/1969 United Kingdom ........... 244/151 B Primary Examiner—Charles E. Frankfort
Attorney, Agent, or Firm—Lester Horwitz

[57] ABSTRACT

This invention provides an apparatus for releasably attaching all strands or risers of a parachute from a harness of the parachutist and comprises a series of loops each attached to the strands, at least one of these loops attached to each of the strands, each loop being insertable through the preceeding loop of the series and a flexible thong releasably securing the last loop in the series.

6 Claims, 4 Drawing Figures

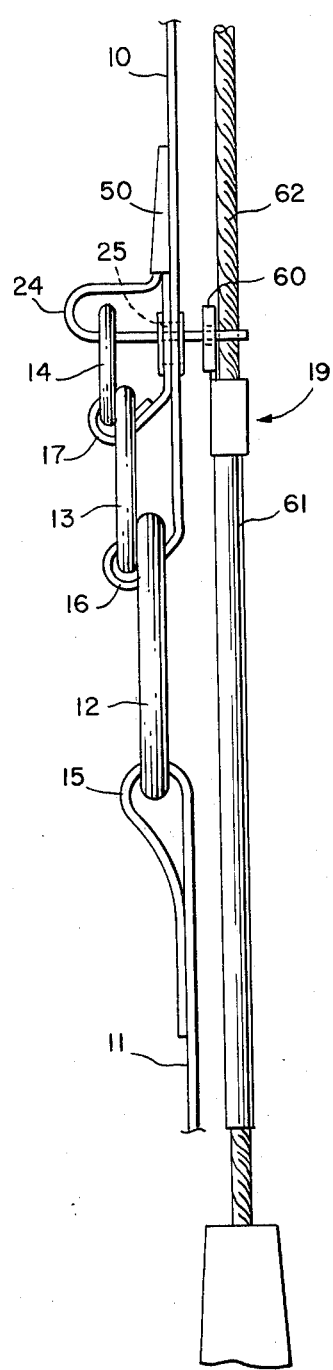
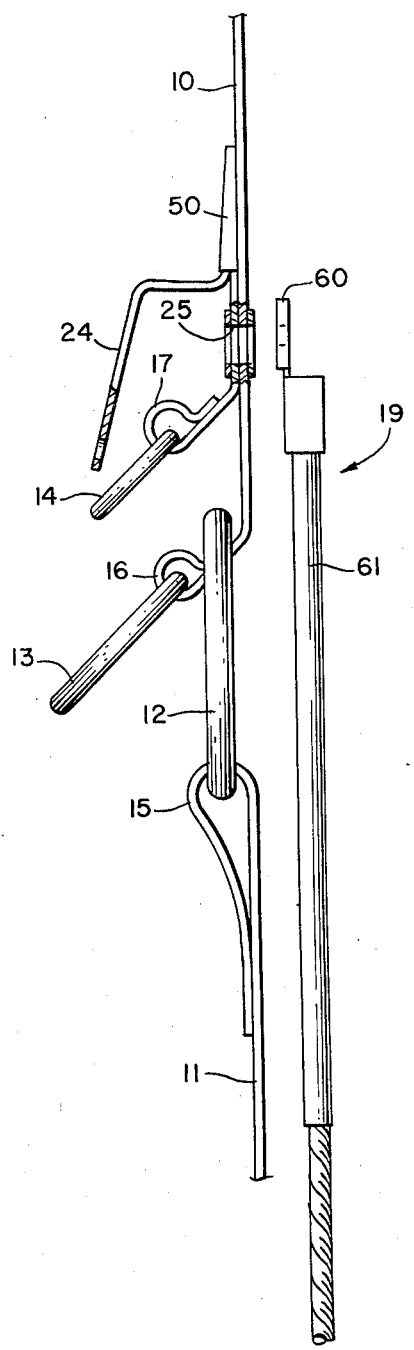

MEANS FOR RELEASABLY ATTACHING STRANDS

This is a continuation of application Ser. No. 895,409 filed Apr. 11, 1978, now abandoned.

BACKGROUND OF THE INVENTION

This invention relates to means for releasably attaching strands and comprises a series of loops attached to said strands at least one of said loops being attached to each of said strands and each loop being insertable into the next loop of the series and means for releasably securing the last loop in said series.

While this invention can be used to attach any types or number of strands it has been found most useful in parachutes.

In certain instances where it is important for a chutist or jumper to effect a release from the main parachute under emergency conditions, time is of the essence. For example, should the main chute malfunction, a chutist must be able to jettison that chute in order to make effective use of a reserve chute. In addition, when the chutist lands in water, or a tree, or is being dragged by a heavy wind on the ground, the ability to effect quick release from the parachute may be critical. In early developments of the parachute in order to effect such a release the jumper had to cut the webbing connecting the risers which connect the canopy of the parachute to the harness mounted on the jumper's body. With the advent of sport jumping and military parachuting the development of a mechanical connection adapted for quick release of the main chute from the chutist's body harness became a matter of much interest. Earlier mechanisms were designed primarily for use after the jumper had reached the ground. In those instances, the weight of the jumper was no longer being exerted on the webbing and, therefore, that manipulation of the release mechanism was facilitated. This mechanism was later adapted for use where deployment of a reserve chute was made necessary or desirable during fall. However, here the weight of the jumper makes the release difficult.

Prior mechanisms involve use of a mechanical linkage connecting the risers to the harness. Disconnect of such mechanisms required the exertion of a strong pull on a cable after removal of a metal cover plate enclosing the linkage system. Moreover, the links of such system remaining on the harness could flap loosely causing injury to the jumper or causing the fouling of the reserve chute.

With the advent of sport parachuting, and the adaption of parachuting to many other uses, (as i.e., firefighting, where the jumper must be extremely accurate to land at a predetermined spot and also where he carries must equipment and is at a heavy weight), accuracy is very important. Accuracy is achieved by jumping from the airplane at as low an altitude as possible and falling through the air the least amount of time so that there is a minimum of drift. Obviously, one must jump high enough so that if there is a main chute malfunction there is still time to jettison it and deploy the reserve chute. The present invention increases the safety of this kind of operation in that the time needed to release the main chute and deploy the reserve chute is reduced. There is also a much higher percent of accuracy because use of the present invention allows a jump at a much lower altitude as will be hereinafter explained.

A jumper could easily injure one arm upon departing the aircraft by either striking the aircraft with one of his arms, or in air having the aircraft hit him. Further, upon deployment of the main chute it is possible for the risers to become entangled in the jumpers limbs or extremities so that he cannot use them to effectively jettison the main chute. Thus, as in the prior art there is a mechanism over each arm, there would be difficulty in releasing the mechanisms that are located over the shoulder of the injured arm. And if because of the injury the jumper was only able to release one mechanism at a time the jumper would then be suspended from the other shoulder, while spinning and twirling. Reaching up and releasing himself from the other riser using the remaining mechanism would be almost impossible.

Another disadvantage is decision time. That is, if the chutist has a malfunction, he must decide whether he has enough time to releae the main chute and then deploy the reserve chute. He may have come so close to the ground that he must take a chance and deploy the reserve chute immediately in order to save his life. He must thus take the chance that while the reserve chute will deploy effectively, as the main chute has not as yet been released, the reserve chute may get caught in it. In the present invention the main chute can be released so quickly and easily that the above problem is moot. Jettisoning the main chute, and deploying the reserve chute can be done with one motion. The release mechanism and reserve chute can be so incorporated that there is one rip cord to release the reserve chute and at the same time, or in sequence, jettison the main chute. There is now no decision time needed or wasted. Approximately 1000 feet of altitude is now not needed as a safety buffer time, or time is now not needed to perform main chute release by use of the main chute release mechanisms located over each shoulder, and then deployment of the reserve chute. Deployment and accuracy for the firefighter or the sport parachutist is therefore enhanced and the safety factor of being able to effectively deploy the reserve chute at lower altitude is maintained. Thus, one can jump lower, drift less, be more accurate, and still in an emergency be able to deploy the reserve chute in enough time for its use to be effective.

Another advantage of our invention is that training time is cut practically in half as one need not discuss with the student the decision factors of when or how to use the reserve chute as hereinbefore mentioned. The student need not be taught to take into account the sequence of deployment. He need not take the time to decide or to make a decision or to judge his height above the ground, as for example "Am I so close to the ground that I do not have the time to disengage myself from the main chute? Must I immediately deploy my reserve chute thus taking a chance of the reserve chute getting entangled with the main chute?" In our system, if he must deploy the reserve chute, all he need do is to pull the one handle and he is automatically and quickly released from the main chute and also has reserve chute deployment.

This invention successfully ends all of these problem areas. Additionally, military or sport parachutists for special reasons need to make high altitude jumps. The military uses high altitude jumps in that the friendly airplane invades the airspace of an enemy at an extremely high altitude so as to avoid detection and the jumper is released therefrom. The sport parachutist is jumping at a high altitude for the sake of the sport, or the parachutist may just be jumping in a cold climate environment. In all of these cases, the jumper would of necessity be wearing gloves or other cold weather protective gear. Clothed for this cold climate encounter, it would be difficult for the jumper to move or stretch upwards so as to reach the prior art mechanism, and if reached, it would also be difficult or combersome to engage the prior art mechanism with the hands and/or fingers covered. With the prior mechanisms, (1) the cover must either be pulled down and freed; (2) the finger must be inserted into the exposed cable; and (3) the cable must be pulled or activated. It is obvious then, that this mechanism and other mechanisms which are currently employed, all of which use basically a similar design system, are difficult to reach and operate if your hands are cold or have been exposed to cold, or if gloves are being worn.

SUMMARY OF THE INVENTION

This invention relates to means for releasably attaching strands and comprises a series of loops at least one of said loops being attached to each of said strands and each loop being insertable into the next loop in the series wherein there are means for releasably securing the last loop in said series.

While this invention can be used to attach any types or number of strands it has been found most useful in parachutes.

The invention provides a releasable attaching mechanism for a parachute which permits release of said parachute from the harness worn by the jumper on exertion of a pull of 1 pound as contrasted with a 15 pound pull required for the prior art disconnect mechanisms. After release of the parachute, there are no heavy links or sharp edges left protruding from the harness remaining on the jumper. Further, a rip cord could be utilized which is easy to grasp by the jumper using either hand, under any conditions of fall or landing. The rip cord can be set up so that; it could simultaneously release the mechanisms at each shoulder; or it could release each in turn; or it could release each in turn and then release the reserve parachute. All this could be done from the same single pull of the same rip cord.

BRIEF DESCRIPTION OF THE DRAWINGS

FIG. 2 is a side view of the mechanism shown in FIG. 1.

FIG. 3 is a side view of the mechanism after it is released.

DETAILED DESCRIPTION

Figure 1:
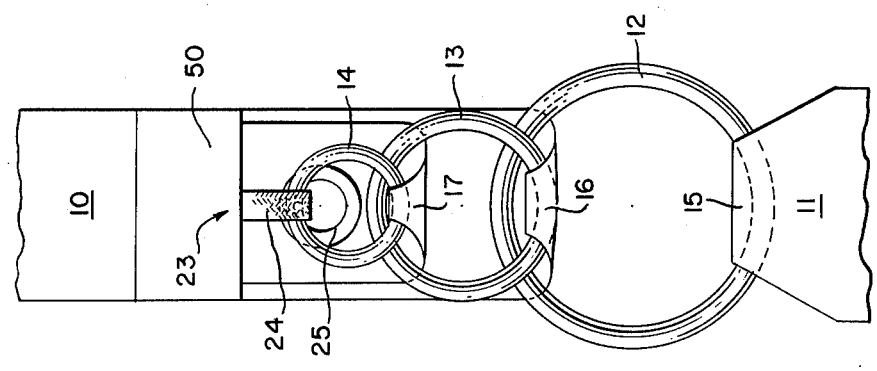
FIG. 1 is a plan view of the mechanism of the present invention.

FIG. 1 shows an embodiment of the apparatus. There is shown two strands, riser web 10 and body harness 11. The body harness 11 is releasably coupled to the usual parachute riser webs 10 interconnected by the usual suspension lines (not shown) to a main parachute canopy (not shown) by a connector device of my invention, a releasable attaching mechanism 19, as described below. The releasable attaching mechanism 19 includes loops which in this embodiment are metal rings of different diameters, however, the loops can be of any material and can be flexible or sturdy. The loops can also be of any shape including circular, as shown, or square. In this embodiment largest ring 12 is attached to body harness strand 11 by attaching means 15. Intermediate ring 13 and smallest ring 14 are attached to riser web strand 10 by attaching means 16 for the intermediate ring and attaching means 17 for the smallest ring. The largest ring 12 in the series accommodates the next intermediate ring 13 so that the latter fits freely therethrough. The intermediate sized ring 13 likewise accommodates the smallest ring 14 so that the latter fits freely through said intermediate sized ring 13. Means 23 then releasably secure smallest ring 14.

Means 23 comprise, in this embodiment, thong 24. Thong 24 is of flexible material and is attached to strand 10 by means 50 and is provided to releasably connect the bottom-most portion of the circumference of small ring 14. Thong 24 then covers the bottom part of small ring 14 and goes through eyelet aperture 25 on riser strand 10 (see FIG. 2). Thong 24 then goes through aperture 60 on end of rip chord assembly 61. Rip chord 62 then goes through an aperture on the end of the thong 24. As shown in FIG. 2, aperture 60 must be adequate to permit thong 24 to be pulled free to allow release of the apparatus. To release the mechanism rip chord 62 is pulled into rip chord assembly 61 releasing thong 24. The pull of the weight on body harness strand 11 forces the disengagement of rings 12, 13, and 14.

The quick disconnect mechanism is then operated by exerting a pull on the rip chord 62 by using handle 63. It is understood that a single rip chord 62 may extend through the end of the thong 24 placed in a similar manner at each shoulder of the wearer. The pull thereby releases each thong 24 and the weight of the chutist's body strapped into the body harness 11 will result in almost instantaneous disconnect of the mechanism in the following sequence. The end of the thong 24 is no longer restrained and is pulled through the ring eyelet aperture 60 fastened at the end of rip cord assembly 61 and through the aperture 25 in the riser web 10 thus releasing the bottom-most end of the smallest ring 14 from its retained position against the webbing. The smallest ring 14 is pulled through the intermediate ring 13. Intermediate ring 13 is pulled through largest ring 12. The largest ring 12 and body harness strand 11 are now completely free from the riser web 10 which has intermediate ring 13 and the smallest ring 14 attached to it. The arrangement of the three rings, largest ring 12, intermediate ring 13 and smallest ring 14 and the interconnection thereof could be selected with a mechanical advantage so that for a chutist of average weight a pull of only 1 pound on the handle 63 of the rip chord cable 62 would be required for disconnect. The time elapsed for the entire sequence of the disconnect would be approximately one second.

It should also be noted that the thong 24 is the key to effecting release of the disconnect mechanism. In the event that the rip chord handle 63 cannot be reached or becomes fouled in the parachute gear or harness only a small knife would be required to cut the thong 24 to initiate release. This is contrasted with the large cutting blade and force required to cut through the riser webbing strands 10, attached to the risers of the parachute as would be necessary for release with prior art harness structures.

Figure 4:
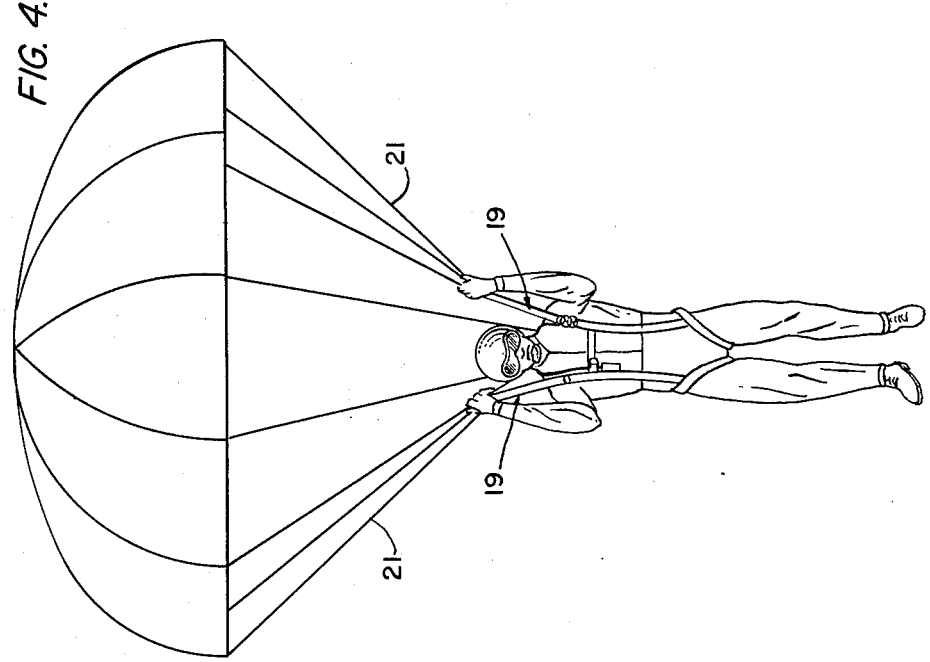
FIG. 4 is an illustration of a conventional parachute canopy in which the mechanism is used.

Referring now to FIG. 4 it is shown that there are two of the apparatus 19 of the present invention. Each one attaches the body harness 11 to the riser web 10. If the parachute (not shown) should fail or become a streamer, or become damaged so that it must be jettisoned, both units 19 must be activated. To do this only a 1 pound pull need be applied on each rip chord 62.

The rings 12, 13 and 14 provide the mechanical advantage necessary to reduce the pull needed to a 1 pound pull. As this pull is so reduced, the rip chords 62 and be assembled together so that as the pull on the rip cord is exerted, it is done simultaneously so as to release both mechanisms 19 at the same time. This prevents the parachutist from dangling on one set of riser webs 10 while releasing the other riser web 10. This dangling and being off balance causes a delay in being able to release the reserve chute. The time needed to correct this situation can now be deducted from the time that must be allowed in case of failure of the main chute. The handle 63 for this combined rip chord 61 can be positioned anywhere on the chutist's body to allow for easy access in case one hand of the chutist is non-functional due to injury and the like.

It should be further noted that while circular rings are used in the embodiment described here in detail, other geometric shapes or rectangles of flat bars of different circumference could be used.

Further, any mode of restraint could be used on the small ring in place of a slip thong so long as release thereof will permit the rings or geometric bars to slip one through the other.

I claim:

1. An apparatus for releasably attaching risers of a parachute from a harness of the parachutist and adapted to permit release of the parachute while said parachutist is in mid-air comprising
   a ring member attached to the harness of the parachutist; and
   a series of loops, each directly attached to a respective set of said risers, a first loop in the series being insertable through said ring member on said harness, and each additional loop being insertable through the preceeding loop in the series; and
   a flexible thong turned around the last loop in said series and through a rip cord assembly with a rip cord inserted into an aperture in said thong for releasably securing the last loop in said series and maintaining said loops in contact one with the other when in a secure position.

2. The apparatus of claim 1 wherein said loops are of a sturdy material.

3. The apparatus of claim 2 wherein said loops are circles.

4. The apparatus of claim 3 wherein two of said apparatus are used, each one to attach each set of risers to the harness of the parachutist.

5. The apparatus of claim 4 wherein the rip cords, on each apparatus, are combined whereby a single pull releases both sets of risers.

6. The apparatus of claim 5 wherein said rip cords are also the means for releasing a reserve parachute.

* * * * *